Nov. 13, 1945.  W. J. MORRILL  2,388,699
DRIVING MECHANISM
Filed Dec. 5, 1942
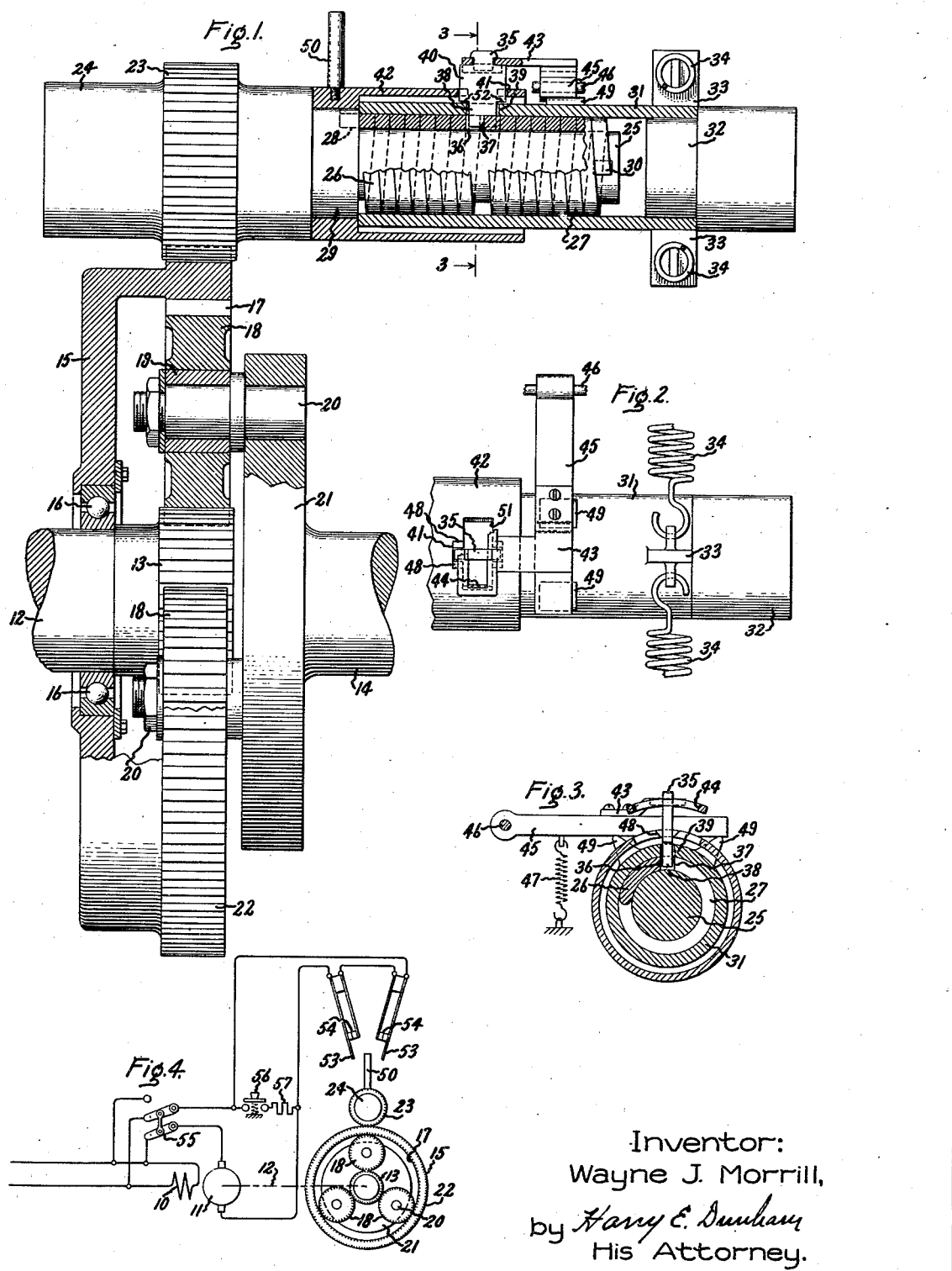
Inventor:
Wayne J. Morrill,
by Harry E. Dunham
His Attorney.

Patented Nov. 13, 1945

2,388,699

UNITED STATES PATENT OFFICE 2,388,699

DRIVING MECHANISM

Wayne J. Morrill, Fort Wayne, Ind., assignor to General Electric Company, a corporation of New York Application December 5, 1942, Serial No. 467,983

3 Claims. (Cl. 74—291)

My invention relates to driving mechanisms and particularly to a driving mechanism in which a unit is arranged to provide a driving connection between driving and driven shafts and is adapted to limit the torque transmitted through the driving connection between these shafts to a predetermined safe operating value.

An object of my invention is to provide an improved driving mechanism arranged to provide a driving connection between driving and driven shafts and also to limit the torque transmitted through the driving connection to a predetermined value.

Another object of my invention is to provide a driving mechanism arranged to form a driving connection between driving and driven shafts with an arrangement for limiting the torque transmitted through the driving connection to a predetermined value and to prevent the formation of the driving connection after it has been released except after a reversal of the driving shaft.

A further object of my invention is to provide an improved driving mechanism wherein one of the gears of a planetary gear system is adapted to be held stationary to provide a driving connection between a driving and a driven shaft when the driving shaft is operating and to limit the torque transmitted through the driving connection to a predetermined safe operating value.

Further objects and advantages of my invention will become apparent and my invention will be better understood from the following description referring to the accompanying drawing, and the features of novelty which characterize my invention will be pointed out with particularity in the claims annexed to and forming part of this specification.

In the drawing, Fig. 1 is a schematic illustration of a driving mechanism including a planetary gear system embodying my invention; Fig. 2 is a plan view of a part of the mechanism shown in Fig. 1 illustrating the arrangement of a clutch locking key; Fig. 3 is a sectional end view taken along line 3—3 of Fig. 1; and Fig. 4 is a schematic illustration of the driving system shown in Fig. 1, together with the driving motor and associated switching devices.

Referring to the drawing, I have shown a driving mechanism in which a motor is provided with a field exciting winding 10 arranged to excite a rotatable member or armature 11 provided with a driving connection to a drive shaft 12 on which a spur gear 13 is formed. Torque is adapted to be transmitted from the driving motor shaft 12 to a driven shaft member 14 through a planetary gearing in which the spur gear 13 is arranged as the driving sun gear of the gear system. A ring gear 15 is rotatably supported by a bearing 16 about the drive shaft 12 and is provided with internal gear teeth 17 arranged in engagement with three planet gears 18 rotatably mounted on bearings 19 about stub shafts 20 supported by a planet cage 21 formed on the driven shaft 14. Torque is adapted to be transmitted from the drive shaft 12 and the sun gear 13 to the driven shaft 14 through the planet gears 18 when the ring gear 15 is held stationary. An arrangement is provided for forming this driving connection by holding stationary the ring gear 15 and also to provide for the release of this driving connection when the torque transmitted through the gearing system exceeds a predetermined safe operating value. This is obtained by providing a set of external gear teeth 22 on the ring gear 15 arranged in engagement with a load limiting and release gear 23 formed on a rotatably supported auxiliary shaft 24. The shaft 24 is provided with an extension 25 about which a pair of spring brakes 26 and 27 is arranged. The outer end 28 of the spring brake 26 is secured in an opening in a shoulder 29 formed on the shaft 24 and the outer end 30 of the spring brake 27 is secured in an opening near the end of the shaft extension 25. These two spring brakes are arranged within a brake sleeve 31 which is mounted about a stationary supporting bearing 32 and is provided with a pair of projections 33, each of which is resiliently biased to a centered position by a pair of preloading springs 34. In order to obtain positive operation of the spring brakes 26 and 27, a brake operating stop pin or locking key 35 is arranged to project between the adjacent inner free ends 36 and 37 of the spring brakes 26 and 27, respectively. This pin 35 is formed with a relatively narrow operating end portion 38 which is adapted to extend through a relatively narrow slot 39 formed in the brake sleeve 31 and is also provided with a relatively wider upper portion 40 which is wider than the slot 39 in the brake sleeve 31. When the operating stop pin 35 is in operating position as shown in the drawing, the wide portion 40 of the pin extends through a relatively wide central portion 41 of an elongated slot in an outer sleeve 42. This sleeve 42 is mounted on the shoulder 29 of the shaft 24 and forms a relatively high friction rotatable fit therewith. The pin 35 is biased into its brake operating position, as shown in Fig. 1, by a carrying finger 43 which is formed with an elongated slot 44 which extends about and forms a sliding fit with the head of the pin 35. This finger 43 is rigidly secured to an operating arm 45 pivotally supported by a pivot pin 46 and resiliently biased by a spring 47 toward the brake sleeve 31, so as resiliently to bias the operating finger 35 into its operating position in the slot portion 41 and the slot 39 of the sleeves 42 and 31, respectively. In this position, when torque is transmitted to the sun gear 13 by the drive shaft 12, the planet gears 18 rotate about the shafts 20 and exert a torque on the ring gear 15 and the planet cage 21. The ring gear 15 transmits this torque to the loading gear 23 which transmits the torque to the spring brakes 26 and 27, respectively, through their connections 28 and 30 to the shaft 24. This tends to turn the spring brakes 26 and 27 which causes one of the free ends 36 and 37 thereof to engage the stop pin portion 38, which produces engagement of the corresponding spring brake 26 or 27 by its expansion against the inner cylindrical surface of the brake sleeve 31. Engagement of either of the brakes transmits the torque through the brakes to the sleeve 31 and if the torque does not exceed a predetermined safe operating value, the springs 34 hold the brake sleeve 31 in centered position and thereby hold stationary the brakes 26 and 27 and the shaft 24. This prevents rotation of the gear 23 and consequently holds stationary the ring gear 15 and causes the planet gears 17 to rotate about the sun gear 13 and transmit torque to the driven shaft 14. If the torque which is transmitted through this driving connection exceeds a predetermined value, the spring brakes 26 and 27 will tend to turn the brake sleeve 31 against the centering action of the springs 34 and this will cause tapered wedge surfaces 48 on the sides of the slot portion 41 in the sleeve 42 to contact the sides of the widened portion 40 of the stop pin, thereby tending to lift the stop pin out of the slots 39 and 41. Furthermore, this turning of the sleeve 31 will cause one cam of a pair of cams 49 formed on the outer surface of the sleeve 31 to rotate upwardly, as seen in Fig. 3, and bias the operating arm 45 upwardly against the biasing action of the spring 47. This will lift the operating finger 43 which in turn will lift the pin 35 out of the slot 39 formed in the brake sleeve 31 and will thereby release the engagement of the inner free ends 36 and 37 of the spring clutches 26 and 27 from engagement with the narrow portion 38 of the stop pin 35. This releases the driving connection formed by the brakes 26 and 27 between the relatively stationary brake sleeve 31 and the shaft 34 and permits the loading gear 23 to rotate. This releases the ring gear 15 and permits rotation thereof about its supporting bearing 16, thereby releasing the driving connection between the drive shaft 12 and the driven shaft 14. With this arrangement, the load on the gearing system is released whenever the torque transmitted thereby exceeds a predetermined value. This predetermined value may be adjusted by adjusting the tension of the pre-loading springs 34. It is also desirable that the driving motor should be stopped when the driving connection is released in order to prevent damage to the driving motor and the gears which rotate without transmitting load when the driving connection is released. This is obtained by providing a load releasing limit switch which is operable by the brake sleeve 42 when the shaft 24 is released and is rotated by the torque transmitted thereto by the gear 23. To obtain this operation, a limit switch trigger 50 is secured to the sleeve 42 and is adapted to turn with the sleeve 42 to a limited extent due to the rotatable frictional fit between the sleeve 42 and the shoulder 29 of the shaft 24. Thus, when the pin 35 is lifted by the action of the cams 49 to release the load on the gearing system, the lower end of the pin 38 is allowed to extend through a relatively narrow portion 51 of the elongated slot in the sleeve 42 and is prevented from extending downwardly into the slot 39 of the sleeve 31 by engagement of the lower edges 52 of the wide portion 40 of the pin 35 with the outer cylindrical surface of the sleeve 42. This permits a limited rotation of the sleeve 42 with the shaft 24 on rotation of this shaft when the driving connection is released, and the limit switch trigger 50 is arranged to engage one or the other of a pair of operating fingers 53 of a pair of limit switches 54 connected in series with the circuit of the motor armature 11. A reversing switch 55 also is connected in the circuit of the driving motor armature 11 such that the motor armature can be energized in different directions relative to the energization of the field exciting winding 11 in order to reverse the direction of rotation of the driving motor. Thus, if the spring brakes 26 and 27 release the driving connection between the drive shaft 12 and the driven shaft 14, the load limit switch trigger 50 turns to a limited extent and biases one of the switch fingers 53 so as to open the series connected switches 54 and deenergizes the electric driving motor, thus stopping the operation of the motor and its associated driving mechanism. Since the switches 54 are connected in series with the circuit of the armature 11, it is impossible to start the motor after it has been stopped in this manner without reversing the direction of rotation of the driving motor, so as to turn the limit switch operating trigger 50 in a direction opposite to that which caused it to open one of the switches 54. Reverse rotation of the driving motor is obtained by connecting the reversing switch 55 so as to reverse the connections of the armature 11 to the source of electrical power supply and then completing the armature energizing circuit by closing a starting switch 56. This closes the circuit of the armature 11 through a starting resistance 57 and prevents damage to the operating mechanism by causing the motor to start up at a greatly reduced torque until the switches 54 have been closed by operation of the limit switch trigger 50. This reverse rotation of the driving motor 11 transmits a reverse torque to the loading gear 23 through the planetary gearing and causes the brake sleeve 42 to turn in an opposite direction from that in which it turned to stop the operation of the mechanism and causes the lower edges 52 of the brake operating pin 35 to slide downwardly over the tapered surface 48 of the slot 41 to permit the pin 35 to return to a brake operating position with the relatively narrow portion 38 extending through the opening 39 in the sleeve 31, so as to engage one of the free ends 36 and 37 of the spring brakes 26 and 27 and again provide a driving connection through the planetary gearing by holding stationary the loading gear 23 and the ring gear 15. Thus, this driving mechanism provides an arrangement which forms a driving connection between a driving shaft and a driven shaft and automatically limits the torque transmitted through this driving connection to a predetermined safe operating value and also provides for stopping the operation of the driving mechanism when this predetermined torque has been exceeded. Furthermore, the construction of the load releasing brake provides for preventing the biasing of the operating pin into its operating position to prevent the formation of a driving connection after this driving connection has been released, except by a reversal of the direction of rotation of the driving motor. Such reversal assures against impressing a destructive torque on the driving mechanism and tends to operate the driven mechanism to a safe position after the excessive torque has been released.

While I have illustrated and described a particular embodiment of my invention, modifications thereof will occur to those skilled in the art. I desire it to be understood, therefore, that my invention is not to be limited to the particular arrangement disclosed, and I intend in the appended claims to cover all modifications which do not depart from the spirit and scope of my invention.

What I claim as new and desire to secure by Letters Patent of the United States is:

1. A driving mechanism including an electric driving means, a driven member, means including a planetary gearing for providing a driving connection between said driving means and said driven member, said planetary gearing including a sun gear arranged to be driven by said driving means, a ring gear, planet gears rotatably supported by said driven member and arranged in engagement with said sun and ring gears, a load connecting and releasing means including a spring brake operable in response to operation of said driving means for holding stationary said ring gear to provide said driving connection between said driving means and said driven member, means including a brake operating stop pin biased towards a brake operating position for engaging said spring brake to provide said driving connection when said pin is in operating position, means including an operating member for actuating said stop pin away from said brake operating position for releasing said driving connection above a predetermined torque through said driving connection, means operable in response to said release of said connection for stopping operation of said driving means, and means including an element for preventing said pin from being biased into said operating position for preventing formation of said driving connection after said release thereof except by reversal of said driving means.

2. A driving mechanism including an electric driving means, a driven member, means including a planetary gearing for providing a driving connection between said driving means and said driven member, said planetary gearing including a sun gear arranged to be driven by said driving means, a ring gear, planet gears arranged in engagement with said sun and ring gears and rotatably supported by said driven member, a load connecting and releasing means including a spring brake operable in response to operation of said driving means for holding stationary said ring gear to provide said driving connection between said driving means and said driven member, means including a brake operating stop pin biased towards a brake operating position for engaging said spring brake to provide said driving connection when said pin is in operating position, means including a resiliently biased operating member for actuating said stop pin away from said brake operating position for releasing said driving connection above a predetermined torque through said driving connection, means operable in response to said release of said driving connection for stopping operation of said driving means, and means including an element for preventing said pin from being biased into said operating position for preventing formation of said driving connection after said release thereof except by reversal of said driving means.

3. A driving mechanism including an electric driving motor means, a driven member, means including a planetary gearing for providing a driving connection between said driving means and said driven member, said planetary gearing including a gear arranged to be driven by said driving means, a second gear, planet gears arranged in engagement with said first-mentioned and second gears and rotatably supported by said driven member, a load connecting and releasing means including a spring brake operable in response to operation of said driving means for holding stationary said second gear to provide said driving connection between said driving means and said driven member, means including a brake operating stop pin biased towards a brake operating position for engaging said spring brake to provide said driving connection when said pin is in operating position, means including a resiliently biased operating member for actuating said stop pin away from said brake operating position for releasing said driving connection above a predetermined torque through said driving connection, means operable in response to said release of said driving connection for deenergizing said electric driving motor, and means including an element for preventing said pin from being biased into said operating position for preventing formation of said driving connection after said release thereof except by reversal of said driving motor.

WAYNE J. MORRILL.